United States Patent Office 2,762,802
Patented Sept. 11, 1956

2,762,802
OPTICAL BRIGHTENING AGENTS
Heinrich Häusermann, Basel, Switzerland, assignor to J. R. Geigy A.-G., Basel, Switzerland, a Swiss firm
No Drawing. Application March 28, 1955,
Serial No. 497,423
Claims priority, application Switzerland March 31, 1954
6 Claims. (Cl. 260—249.6)

The present invention concerns optical brightening agents, that is, compounds which is slight amounts on more or less white substrata bring about an optical brightening in daylight due to their violet-blue, blue to greenish-blue fluorescence. In particular it is concerned with derivatives of 4.4'-diaminostilbene - 2 - monosulphonic acids which possess new and valuable properties, with processes for the production of such compounds and their use for the brightening of more or less white substrata, as well as with the material brightened with the help of these compounds.

It is known that 4.4'-diaminostilbene-2.2'-disulphonic acid is a valuable starting material for the production of the optical brightening agents used in technics. Products of this type are obtained for example by the introduction of aroyl, phenylcarbamyl or 1.3.5-triazinyl radicals into the amino groups of the main substance, within certain margins, the water solubility, the substantivity, the intensity of fluorescence and the colour of the fluorescence light can be influenced by the substitution of these radicals. Given favourable intensity of fluorescence and blue to greenish-blue fluorescence colour, often the water solubility and the substantivity, which is often influenced by the water solubility, decide the usefulness of such compounds as additives to anion active wetting and cleaning agents in washing and rinsing liquors for textile washing. This range of application is of particular industrial interest because cleansing agents containing optical brightening agents are used in great amounts.

It has now been found that the water solubility, substantivity, intensity of fluorescence and colour of fluorescence can be influenced in optically active derivatives of 4.4'-diaminostilbene not only by substitution of the aroyl or the triazinyl radicals but also often with advantage it can be favourably influenced by substitution of the stilbene radical. Thus, for example, 4.4'-bis-triazinyl-aminostilbene compounds which, for optical reasons, contain the substituted amino groups in the triazinyl radical which increase the water solubility can be more suitable for use in washing liquors if they are derived from a 4.4'-diaminostilbene-2-monosulphonic acid than analogous derivatives of 4.4'-diaminostilbene-2.2'-disulphonic acid. In this case, the o-position to the ethylene linkage in the unsulphonated benzene ring of the stilbene radical can be unsubstituted or it can be occupied by non-ionogenic substituents, e. g. by halogen, alkyl, cyano, alkylsulphonyl, arylsulphonyl, sulphonic acid amide (including sulphonic acid amide organically substituted at the nitrogen atom), or acyl substituents. In this position, the positivising substituents have a particularly marked effect on the colour of the fluorescence light; this is relatively slighter with methyl, isopropyl and tert. butyl groups, but very marked with alkoxy groups such as, for example, methoxy, ethoxy, propoxy, butoxy, methoxyethoxy, ethoxyethoxy or benzyloxy groups as well as with the hydroxyethyl or the hydroxypropyl group. These alkoxy groups in the o-position to the ethylene linkage of the stilbene radical cause the greatest shifting of the colour of the fluorescence light from violet or blue towards green. This is a particularly valuable property in 4.4'-bis-triazinylaminostilbene compounds because analogues derived from 4.4'-diaminostilbene-2.2'-disulphonic acid often have an undesirable reddish-blue fluorescence. If derivatives of 4.4'-diaminostilbene-2.2'-disulphonic acid have a too reddish fluorescence, the colour of the fluorescence light in the corresponding derivatives of a 4.4' - diamino - 2 - alkylstilbene-2'-sulphonic acid is shifted towards blue and in those of a 4.4'-diamino-2-alkoxystilbene-2'-sulphonic acid it is shifted towards greenish-blue. The compounds derived from 2-alkyl- or 2-alkoxy-4.4'-diaminostilbene-2'-sulphonic acids and in particular the bistriazinyl derivatives thereof, are the most valuable brightening agents according to this invention. Apart from the substitution of the stilbene radical in the o-position to the ethylene linkage mentioned above, if desired non-ionogenic substituents of the type defined above can also occupy other positions in the two benzene rings of the stilbene radical.

New optical brightening agents according to this invention are obtained if compounds of the general Formula I

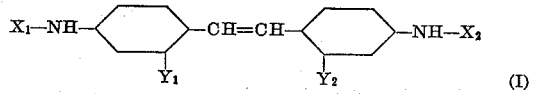

$$X_1-NH-\underset{Y_1}{\underset{|}{\bigcirc}}-CH=CH-\underset{Y_2}{\underset{|}{\bigcirc}}-NH-X_2 \qquad (I)$$

wherein the one X represents hydrogen, a carbacyl radical or a 1.3.5-triazinyl radical and the other X represents hydrogen, the one Y represents the free sulphonic acid group of one neutralised by bases, and the other Y represents hydrogen or a non-ionogenic substituent, preferably a low molecular alkyl or alkoxy group, and wherein the benzene rings of the stilbene radical can possibly contain further non-ionogenic substituents, are reacted with compounds introducing 1.3.5-triazinyl radicals or carbacyl radicals until the primary amino groups have disappeared. In this reaction the components should be so chosen that in the end product at least one X represents either an aminosubstituted 1.3.5-triazinyl radical, an aryl carbamyl radical or an aroyl radical, of which the latter is substituted preferably in at least an o- or p-position to the carbonyl group by substituents having a positivising action, e. g. it contains a p-methyl, p-alkoxy, p-hydroxyalkoxy or a p-acetamino and/or an o-alkoxy or hydroxyalkoxy group. Any mobile substituents in the 1.3.5-triazinyl radicals can also be replaced entirely or in part later by methods known per se by other substituents, in particular by positivising groups, preferably by amino groups, which, if desired, can be organically substituted. They may also be replaced, however, by, for example, the hydroxyl, an aryloxy group, alkyl or aryl-mercapto group.

Radicals of organic carboxylic acids including organic derivatives of carbonic acid are termed "carbacyl radicals". Preferably the acid halides and possibly also the acid anhydrides are compounds which introduce the carbacyl radicals. For the purpose of this invention, radicals of lower fatty acids, radicals of carbonic acid half esters with lower alcohols, radicals of carbamic acids, preferably, however, aroyl radicals of the benzene series, possibly also of the naphthalene series, can be used as carbacyl radicals. Suitable aroyl radicals are, for example, the benzoyl, p-methylbenzoyl, p-methoxybenzoyl, p-ethoxybenzoyl, o-methoxybenzoyl, o - ethoxybenzoyl, o.β-hydroxyethoxybenzoyl, p-methyl - o - methoxybenzoyl, p-methyl-o-ethoxybenzoyl, p-methyl - o.β - hydroxyethoxybenzoyl, 2.4-dimethoxybenzoyl, 2-methoxy-3-naphthoyl or the 2-ethoxy-3-naphthoyl radical. Under suitable conditions, also isocyanates and bisulphate addition compounds thereof can be used as compounds introducing carbamyl radicals.

Cyanuric halides, in particular cyanuric chloride, can be used as compounds which introduce the 1.3.5-triazinyl radical. Their halogen atoms can be reacted by methods known per se, in the cold in the first step, at medium temperatures in the second step and at higher temperatures in the third step, the reaction being performed in the presence of acid binding agents. To introduce the 1.3.5-triazinyl radical into compounds of the general Formula I, it is advantageous to use these cyanuric halides in aqueous suspension in the first step. They may also possibly be used in the second step insofar as the amide radical introduced in the first step has the properties which bring about water solubility. All or some of the halogen atoms remaining at the cyanuric ring are later replaced, preferably by amide radicals. If desired however, some of them can also be replaced by other positivising groups, for example, by the hydroxyl, a phenoxy group, an alkylmercapto or phenylmercapto group.

Suitable amide radicals are derived from ammonia and, preferably, from primary and secondary organic amines. Alkyl, hydroxyalkyl, aralkyl, cycloalkyl, aryl groups (preferably phenyl and substituted phenyl groups) and also heterocyclic radicals are examples of organic radicals thereof. In heterocyclic amide radicals the nitrogen atom bound to the triazinyl radical can be a member of the hetero ring, such as for example in the piperidine and in the morpholine radical, or it can belong to the amino group of a heterocyclic amino compound, such as for example in 2-aminopyridine, in the 2-aminopyrimidine or in the 2-aminothiazole radical.

Compounds of the general Formula I which are usable according to the present invention are obtained for example according to the United States Patent No. 2,657,228, by condensation of 4-nitro-1-methylbenzene-2-sulphonic acid aryl esters at higher temperatures in the presence of strong organic nitrogen bases with 4-nitro or 4-acylamino-benzaldehydes to form the corresponding stilbene monosulphonic acid aryl esters which are saponified by known methods to form the free sulphonic acids or the salts thereof. The non-ionogenic substituents usual in aromatic rings can also be contained in the 4-nitro-1-methylbenzene-2-sulphonic acid aryl ester component, for example in the 6-position, and in the benzaldehyde component, in particular in the 4-acylaminobenzaldehyde component, in the 2-, 3-, 5- or 6-position. Examples of such substituents are halogen or alkyl, alkoxy, cyano, alkyl or aryl sulphonyl sulphonic acid amide groups and sulphonic acid amide groups organically substituted at the nitrogen atom.

If 4-acylamino benzaldehydes are used for the stilbene condensation, then after saponification, 4-nitro-4'-aminostilbene-2-sulphonic acids are obtained which are suitable for the formation of the brightening agents according to this invention which are unsymmetrical with regard to the substitution of the amino groups. For example, they can be reacted or acylated with cyanuric chloride and two molecules of ammonia or primary or secondary organic amines in the presence of acid binding agents, for example with an aroyl halide which may possibly be suitably substituted or with an arylisocyanate and then the nitro group is reduced to the amino group.

If the nitro groups are reduced to the amino groups first, then 4.4'-diaminostilbene-monosulphonic acids are obtained which are suitable for the formation of symmetrical amine derivatives.

In the form of their alkali salts, in particular, the lithium, potassium, sodium or ammonium salts, the new brightening agents are more or less strongly yellowish to yellow coloured powders which in water more or less easily according to the composition form colourless to weakly yellowish solutions. The aqueous solutions thereof have a strong fluorescence in ultra violet light. Finely distributed in or on more or less white substrata such as cellulose fibres, soaps, synthetic washing agents, polyamide fibres in a content of 0.001 to 0.1% according to the composition, they cause a strong brightening effect in daylight due to the blue fluorescence.

The following examples illustrate the production of some of the compounds according to the present invention and their use for the brightening of more or less white substrata. Where not otherwise stated, parts are given as parts by weight and the temperatures are in degrees centigrade. The relationship of parts by weight to parts by volume is as that of kilogrammes to litres.

*Example 1*

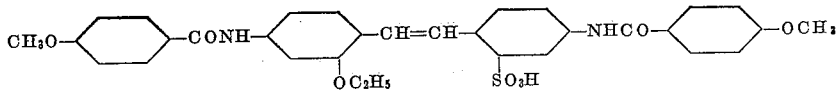

33.4 parts of 4.4' - diamino-2'-ethoxystilbene - 2 - sulphonic acid are suspended in 400 parts of pyridine and at 20–30°, 50 parts of p-methoxybenzoyl chloride are added all at once. The temperature rises spontaneously to about 50° and a clear brownish-yellow solution is formed which is stirred at 60–70° until no more free amine can be traced by the diazotisation test. This generally occurs after only a few minutes. The reaction mixture is then poured into 1500 parts of a 3% sodium chloride solution, caustic soda lye is added while stirring until phenolphthalein paper turns a strong red colour and the pyridine is distilled off with steam. After cooling, the sodium salt, of 4.4'-di-(p-methoxybenzoylamino)-2'-ethoxystilbene-2-sulphonic acid separates as a grey crumbly mass which is washed with 2½% sodium chloride solution and then dried. A yellowish-grey powder is so obtained which dissolves in hot water. In diluted alcohol, the new stilbene derivative dissolves with a blue fluorescence. If cellulose materials which are colourless or have a weakly yellowish appearance are treated with a diluted aqueous solution of this product, then the material treated has a much lighter appearance in daylight than before the treatment. The brightening attained is distinguished chiefly by its blue-green shade.

Somewhat weaker products are obtained if in this example instead of p-methoxybenzoyl chloride, the same amounts of p-methylbenzoyl chloride or benzoyl chloride are reacted with 4.4'-diamino-2'-ethoxystilbene-2-sulphonic acid.

The 4.4'-diamino-2'-ethoxystilbene-2-sulphonic acid used in this example can be easily produced, for example in the following manner: 4-acetylamino-2-ethoxybenzaldehyde (Melting Point 136°) is condensed at 135–145° in the presence of piperidine with 4-nitrotoluene-2-sulphonic acid phenyl ester; the 4-nitro-4'-acetylamino-2'-ethoxystilbene-2-sulphonic acid phenyl ester (M. P. 180–181°) obtained is saponified and the nitrosulphonic acid is reduced to aminosulphonic acid.

*Example 2*

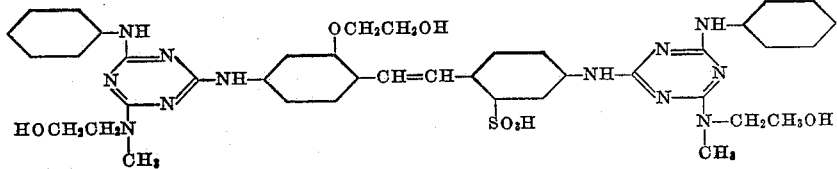

35 parts of 4.4'-diamino-2'-(β-hydroethoxy)-stilbene 2-sulphonic acid, produced by condensation of 4-acetyl-amino-2-(β-hydroxyethoxy)-benzaldehyde with 4-nitro-toluene-2-sulphonic acid phenyl ester to form the 4-nitro-4'-acetylamino-2'-(β-hydroxyethoxy)-stilbene-2-sulphonic acid phenyl ester, M. P. 196°, reduction of the nitro to the amino group and saponification, are dissolved with sodium carbonate to produce a neutral reaction in 700 parts of water. It is then reacted in the usual way first with 37 parts of cyanuric chloride and then with 18.6 parts of aniline and at the same time, an aqueous solution of 21.2 parts of sodium carbonate is added drop-wise. The yellowish suspension obtained is then heated for 4 hours at 90–100°, N-methyl monoethanolamine being added to keep the reaction phenol-phthalein alkaline. At the end of this time, 10 parts per cent by volume of sodium chloride are added. After cooling, the precipitated sodium salt of 4.4'-bis-[4-phenylamino-6-(β-hydroxyethyl-methylamino)-1.3.5-triazinyl-(2) - amino]-2'-(β-hydroxyethoxy)-stilbene-2-sulphonic acid is filtered off under suction, washed with 5% sodium chloride solution and dried in the vacuum at 80–90°. In this manner a grey-yellow powder is obtained which dissolves in hot water. On colourless to weakly yellowish cellulose fibres, this product produces a blue-greenish brightening effect.

If in this example, the N-methyl-monoethanolamine is replaced by morpholine, then a product with a similar action but which is somewhat more difficultly soluble is obtained.

parts of sodium carbonate in 106 parts of water. The sodium salt of 4.4'-bis-[4-(m-sulphophenylamino)-6-chloro-1.3.5-triazinyl-(2)-amino]-2'-methoxystilbene - 2-sulphonic acid obtained is then heated in aqueous solution with 9 parts of N-methyl-monoethanolamine and 10.6 parts of sodium carbonate for 2 hours at 90–100°. The resulting trisodium salt of 4.4'-bis-[4-(m-sulphophenyl-amino)-6-(β-hydroxyethyl-methylamino)-1.3.5 - triazinyl-(2)-amino]-2'-methoxystilbene-2-sulphonic acid is precipitated by salting out with 25% sodium chloride. After filtering under suction, washing with 20% sodium chloride solution and drying, the new stilbene derivative is a pale yellowish powder which is easily soluble in water. The aqueous solution fluoresces green-blue in ultra violet light.

If colourless or weakly yellowish cellulose materials are treated with a diluted aqueous solution of this product, then they have a strong blue fluorescence in ultra violet light and in daylight they have a much more white appearance. The analogous derivative of 4.4'-diaminostilbene-2.2'-disulphonic acid produces a much more violetty brightening effect.

A product which is also strongly active and has similar properties is obtained if in this example the 9 parts of N-methyl-monoethanolamine are replaced by 7.3 parts of monoethanolamine.

*Example 3*

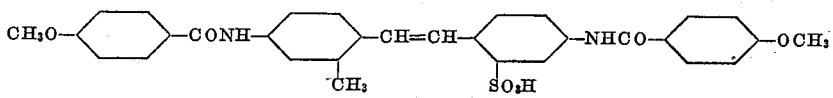

30.4 parts of 4.4'-diamino-2'-methylstilbene-2-sulphonic acid, produced by condensation of 4-acetylamino-2-methyl benzaldehyde with 4-nitrotoluene-2-sulphonic acid phenyl ester to form 4-nitro-4'-acetylamino-2'-methylstilbene-2-sulphonic acid phenyl ester (M. P. 209° uncorrected), reduction of the nitro to the amino group and saponification, are reacted with 50 parts of p-methoxy-benzolychloride as described in Example 1. The sodium salt of 4.4'-di-(p-methoxybenzoylamino)-2'-methylstilbene - 2 - sulphonic acid is a yellow powder which dissolves in water and which is suitable for the brightening of cellulose fibres.

A somewhat less active product is obtained if in this example the p-methoxybenzoyl chloride is replaced by the same amount of p-methylbenzoyl chloride or by 3.4-dimethylbenzoyl chloride.

*Example 4*

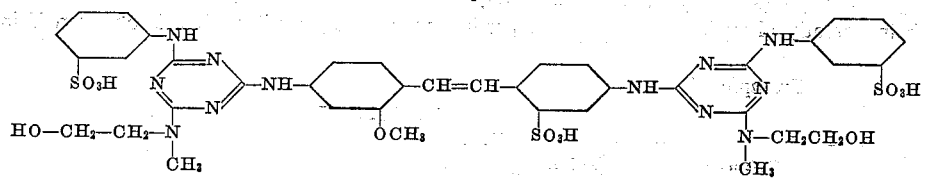

16.0 parts of 4.4'-diamino-2'-methoxystilbene-2-sulphonic acid, produced by reduction and saponification of 4-nitro-4'-acetylamino-2'-methoxystilbene-2-sulphonic acid phenyl ester (M. P. 200°), are reacted consecutively in the usual manner with 18.5 parts of cyanuric chloride and 19.5 parts of the sodium salt of metanilic acid while neutralising the solution by the dropwise addition of 10.6

*Example 5*

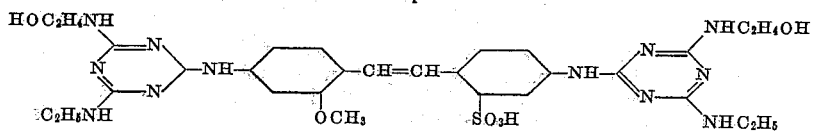

16 parts of 4.4'-diamino-2'-methoxystilbene-2-sulphonic acid are dissolved in 500 parts of water with 2 parts of sodium hydroxide and reacted at 0° with an aqueous-acetone suspension of 18.45 parts of cyanuric chloride. During the reaction the acid liberated is neutralised by the addiiton of, in all, 5.3 parts of sodium carbonate. As soon as no free amino groups can be traced, 6.1 parts of monoethanolamine are added, the whole is heated to 30–40° and 53 parts of a 10% sodium carbonate solution are poured in at this temperature over a period of 2–4 hours. The yellow pulpy mixture is then heated to 90° and is held at 90–100° for 5 hours, the reaction being kept phenolphthalein alkaline with ethylamine. The sodium salt of 4.4'-bis-[4-ethylamino-6-(β-hydroxyethylamino)-1.2.3-triazinyl-(2)-amino]-2'-methoxystilbene-2-sulphonic acid so obtained is completely precipitated with sodium chloride; it is isolated and dried. The product forms a yellow powder; the aqeous-alcholic solution of which fluoresces blue. This product also is excellently suitable for the brightening of cellulose fibres due to its blue fluorescence and good substantivity.

Products with similar properties are obtained if in the above example the final condensation is performed with N-methylethanolamine, diethanolamine, monoethanolamine or morpholine instead of with ethylamine.

Example 6

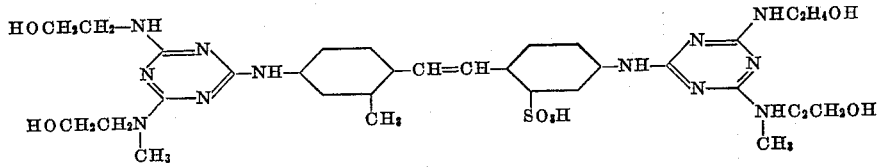

62.2 parts of the sodium salt of 4.4'-[4.6-dichloro-1.3.5-triazinyl-(2)-amino]-2'-methylstilbene-2 - sulphonic acid are finely distributed by stirring in 2500 parts of water and heated to 30–40°. After adding 12.2 parts of monoethanolamine, the whole is stirred for another 5 hours at 30–40° during which time the pH value is adjusted to 7.5 to 8.2 by the slow addition of a solution of 21.2 parts of sodium carbonate in 150 parts of water. 30 parts of N-methyl-monoethanolamine are then added and the whole is stirred at 90–100° for 6 hours. On the addition of 15 parts by volume per cent of sodium chloride, the 4.4'-bis-[4-(β-hydroxy-ethylamino)-6 - (β - hydroxyethyl - methylamino)-1.3.5-triazinyl-(2)-amino]-2'-methyl stilbene-2-sulphonic acid obtained precipitates from the clear yellow solution in the form of the sodium salt. It is a yellow solid mass. After drying, the new stilbene derivative is a yellowish powder which dissolves well in water. Because of its strong fluorescence on cellulose substrata, this product also is excellently suitable for the brightening of cellulose fibres. It can be used in aqueous solution alone or in the presence of washing and cleansing agents.

Products with a very similar action are obtained if in the above example the 30 parts of N-methyl-monoethanolamine are replaced by 42 parts of diethanolamine or a further 24.4 parts of monoethanolamine.

Compared with derivatives of 4.4'-diaminostilbene-2.2'-disulphonic acid having an analogous structure, these new products have a more beautiful white shading as well as better drawing power and an improved fastness to washing.

Example 7

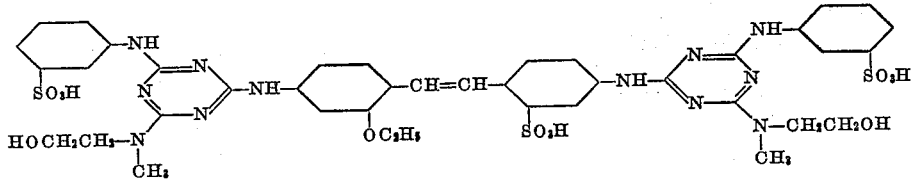

If in Example 4, the 16.0 parts of 4.4'-diamino-2'-methoxy-stilbene-2-sulphonic acid are replaced by 16.7 parts of 4.4'-diamino-2'-ethoxystilbene-2-sulphonic acid, then the trisodium salt of 4.4'-bis-[4-(m-sulphophenyl-amino)-6-(β-hydroxyethyl-methylamino)-1.3.5 - triazinyl-(2)-amino]-2'-ethoxystilbene-2-sulphonic acid is obtained. The product has very similar properties to that obtained according to Example 4. In this case too, the N-methyl-monoethanolamine can be replaced by other primary or secondary aliphatic hydroxyalkylamines such as, for example, mono- or di-ethanolamine without the properties of the end product being greatly altered.

Example 8

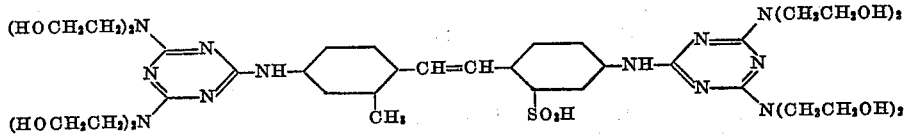

30.4 parts of 4.4'-diamino-2'-methylstilbene-2-sulphonic acid, produced by reduction and saponification of 4.4'-dinitro-2'-methylstilbene-2-sulphonic acid phenyl ester, are dissolved with 5.3 parts of sodium carbonate in 1000 parts of water and reacted, at a pH value of 5.5–6.5, at 0° with 36.9 parts of cyanuric chloride and 10.6 parts of sodium carbonate. 85 parts of diethanolamine are added to the thick yellowish suspension so obtained and the whole is stirred at 95–100° for 4 hours under reflux. By salting out with 25% sodium chloride the sodium salt of 4.4'-bis-[4.6-di-(di-[β-hydroxyethyl]-amino)-1.3.5-triazinyl-(2) - amino]-2'-methylstilbene-2-sulphonic acid is precipitated as a yellow body. After drying, the product is a water soluble pale yellowish powder the aqueous solutions of which can be used for the brightening of cellulose fibres.

Similar products are obtained if in this example, the 30.4 parts of 4.4'-diamino-2'-methylstilbene-2-sulphonic acid are replaced by 32.45 parts of 4.4'-diamino-2'-chlorostilbene-2-sulphonic acid, 30.5 parts of 4.4'-diamino-2'-fluorostilbene-2-sulphonic acid or by 29 parts of 4.4'-diaminostilbene-2-sulphonic acid.

Example 9

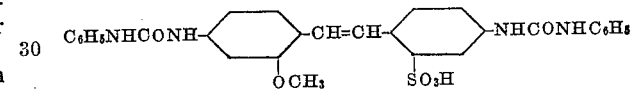

3.2 parts of 4.4'-diamino-2'-methoxystilbene-2-sulphonic acid are dissolved at 20–30° with 0.53 part of calc. sodium carbonate in 300 parts of water and a solution of 3 parts of phenyl isocyanate in 30 parts of acetone is added while stirring well over a period of 30 minutes. After stirring for 10 hours at 20–30°, the yellowish suspension is heated to 70° and 50 parts of acetone are added. Undissolved particles are filtered off from the hot solution, the reaction product is precipitated with sodium chloride and, after cooling, filtered off under suction. It is washed with 2% sodium chloride solution. The 4.4' - bis - phenylureido - 2' - methoxy - 2 - sulpho - stilbene formed is a pale beige coloured powder which dissolves in hot water. This urea derivative produces very strong blue to glue-greenish brightening effects on cellulose fibres. This product also produces a great increase of the degree of whiteness on wool, even on neutral application.

A product with a very similar effect is obtained if in the above example, the 3.2 parts of 4.4'-diamino-2'-methoxystilbene-2-sulphonic acid are replaced by 3.34 parts of 4.4'-diamino-2'-ethoxystilbene-2-sulphonic acid.

Example 10

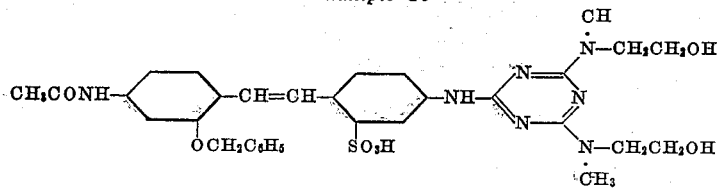

43.8 parts of 4-amino-4'-acetamino-2'-benzyloxy-stilbene-2- sulphonic acid are dissolved with 5.3 parts of sodium carbonate in 2000 parts of water and then reacted first at 0° with 18.5 parts of cyanuric chloride and 5.3 parts of sodium carbonate and then at 50–90° with excess N-methyl-monoethanolamine. The sodium salt of 4-acetylamino - 4' - [2.4 - di - (β - hydroxyethyl - methyl - amino) - 1.3.5 - triazinylamino - (6)] - 2 - benzyloxy - stilbene - 2' - sulphonic acid obtained is isolated by salting out with sodium chloride. After drying, the product in the form of a yellow-grey powder, is soluble in hot water and it produces useful brightening effects both on cellulose as well as on wool and silk.

A product with similar activity is obtained if in this example the N-methyl-monoethanolamine is replaced by N-ethyl-monoethanolamine.

The 4 - amino - 4' acetamino - 2' - benzoyloxy - stilbene - 2 - sulphonic acid used in this example is obtained from the 4 - nitro - 4' - acetylamino - 2' - benzyl - oxystilbene - 2 - sulphonic acid phenyl ester (M. P. 174°) by partial saponification and reduction.

Example 11

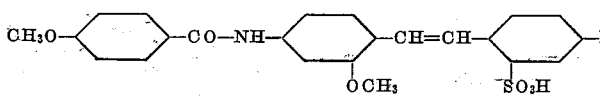

4 - acetylamino - 2 - methoxybenzaldehyde is condensed with 4 - nitrotoluene - 2 - sulphonic acid phenol ester to form 4-acetylamino-2-methoxy-4'-nitrostilbene-2'-sulphonic acid phenol ester and this is saponified to form 4 - amino - 4' - nitro-2-methoxystilbene-2'-sulphonic acid.

35.0 parts of this acid are suspended in 400 parts of pyridine and 21 parts of p-methoxybenzoyl chloride are gradually added at 20–30°. The whole is then stirred at 50–60° until no free amino groups can be traced, which happens in a few minutes. The orange-brown solution is diluted with 1000 parts of 5% sodium chloride solution, caustic soda lye is added until phenolphthalein paper turns red and the pyridine is distilled off with steam. The sodium salt which is filtered off after cooling, is dissolved in 1000 parts of hot water and reduced according to Béchamp with 30 parts of cast iron filings and 5 parts of acetic acid. The 4' - amino - 4 - (4'' - methoxy - benzoylamino) - 2 - methoxystilbene - 2' - sulphonic acid in the form of the sodium salt, which has been isolated in the usual way, is dissolved in 2500 parts of water and then reacted first at 0° with 18.5 parts of cyanuric chloride and 5.3 parts of sodium carbonate and then at 50–90° with 42 parts of diethanolamine. The resulting sodium salt of 4 - (4'' - methoxybenzoylamino) - 2 - methoxy - 4' - [2.4 - di - β - hydroxyethylamino - 1.3.5 - triazinylamino - (6)] - stilbene - 2' - sulphonic acid is isolated by salting out with sodium chloride. The new product, a yellowish powder, dissolves in hot water and causes a strong brightening on cellulose fibres in daylight.

A less greenish product is obtained if in this example 32 parts of 4 - amino - 4' - nitrostilbene - 2' - sulphonic acid are used instead of the 4 - amino - 4' - nitro - 2 - methoxystilbene - 2' sulphonic acid.

Example 12

36.8 parts of 4.4' - diamino - 2' - methylsulphonyl - stilbene - 2 - sulphonic acid, produced by condensation of 4 - nitro - benzaldehyde - 2 - sulphonic acid with 4 - nitro - 2 - methylsulphonyl - 1 - methylbenzene and reduction of the nitro groups to the amino groups, are dissolved in 1000 parts of water with 5.3 parts of sodium carbonate and reacted at 0°, at a pH value of 5.5–6.5, with 36.9 parts of cyanuric chloride and 10.6 parts of sodium carbonate. 50 parts of monoethanolamine are then added to the thick yellowish suspension obtained and the whole is stirred for 2 hours at 90–95°. The sodium salt of 4.4' - bis - [4.4 - di-(β - hydroxyethylamino) - 1.3.5 - triazinyl - (2) - amino] - 2' - methylsulphonyl - stilbene - 2 - sul - phonic acid formed is precipitated by salting out with 10% sodium chloride. After drying, the product forms a water soluble, pale yellowish powder, the aqueous solutions of which can be used for the brightening of cellulose fibres.

Similar products are obtained if in this example the 36.8 parts of 4.4' - diamino - 2' - methylsulphonyl - stilbene - 2 - sulphonic acid are replaced by 39.4 parts of 4.4 - diamino - 2' - isopropyl - sulphonyl - stilbene - 2 - sulphonic acid, 42.5 parts of 4.4' - diamino - 2' - sulphonic acid - diethylamide - stilbene - 2 - sulphonic acid or by 44 parts of 4.4' - diamino - 2' - sulphonic acid - morpholide - stilbene - 2 - sulphonic acid.

Example 13

White cotton poplin is treated for 15 minutes at 40° in a bath containing 0.005 g. of the sodium salt of 4.4'-bis - [4 - (m - sulphophenylamino) - 6 - (β - hydroxyethyl - methylamino) - 1.3.5 - triazinyl - (2) - amino] - 2'-methoxystilbene-2-sulphonic acid obtained according to Example 4 and 2 g. of Glauber's salt per litre (liquor ratio 1:30). After rinsing and drying, the material so treated has a much more white appearance in daylight than before treatment.

Example 14

1 part of white wash, for example pillow cases, sheets, etc. are washed for 30 minutes at the boil in 10 parts of a washing liquor which contains 8 g. per litre of a usual marketed washing agent containing soaps and perborate which contains 0.03% of the sodium salt of 4.4'-di - (p - methoxybenzoylamino) - 2' - ethoxystilbene - 2-sulphonic acid obtained according to Example 1. The goods are then rinsed and dried. A dazzling white wash is obtained which has no unpleasant reddish tinge.

What I claim is:

1. As an optical brightening agent a stilbene compound which in the form of the free acid has the general formula:

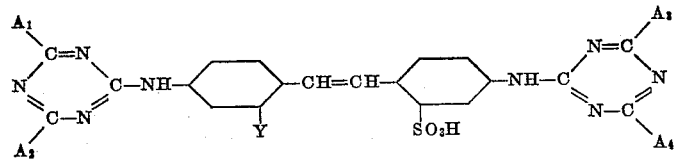

wherein:

$A_1$, $A_2$, $A_3$ and $A_4$ each represents a member selected from the group consisting of primary lower alkylamino, primary lower hydroxyalkylamino, secondary lower alkylamino, secondary lower hydroxyalkylamino, primary mononuclear carbocyclic arylamino and morpholine radicals, and Y represents a member selected from the group consisting of H, halogen, lower alkyl, lower alkoxy, lower hydroxyalkoxy, lower alkylsulphonyl and sulphonic acid amide groups.

2. As an optical brightening agent a stilbene compound which in the form of the free acid has the formula:

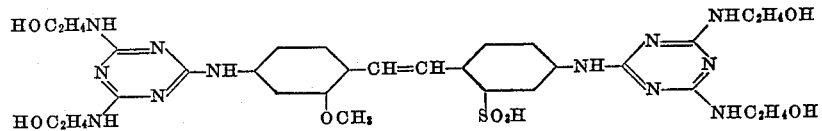

3. As an optical brightening agent a stilbene compound which in the form of the free acid has the formula:

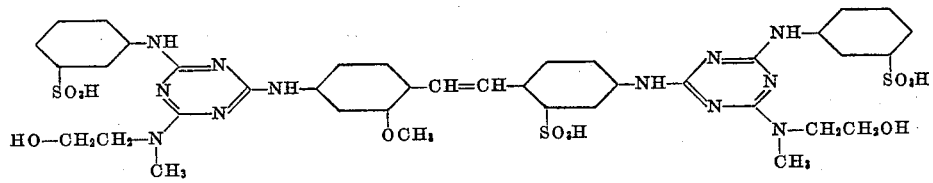

4. As an optical brightening agent a stilbene compound which in the form of the free acid has the formula:

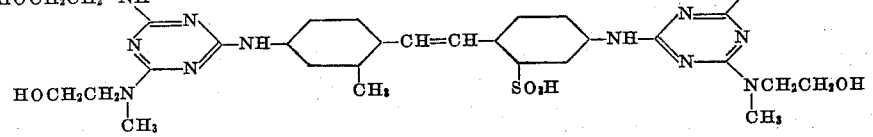

5. As an optical brightening agent a stilbene compound which in the form of the free acid has the formula:

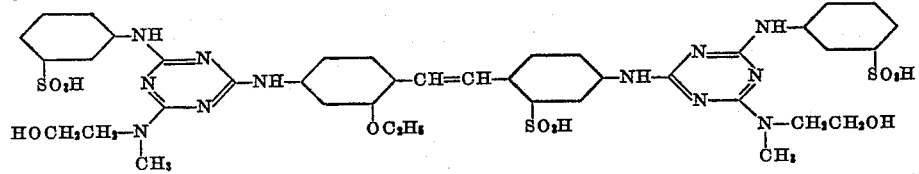

6. As an optical brightening agent a stilbene compound which in the form of the free acid has the formula:

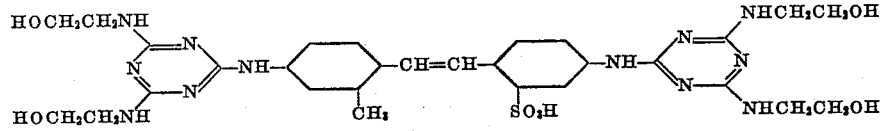

No references cited.